US006856798B2

(12) United States Patent
Vitallo et al.

(10) Patent No.: US 6,856,798 B2
(45) Date of Patent: Feb. 15, 2005

(54) APPARATUS AND METHOD FOR RECEIVING TELEVISION AUDIO SIGNALS IN A MOBILE VEHICLE

(75) Inventors: Nugent J. Vitallo, Oak Brook, IL (US); James Berken, Lombard, IL (US); Chris McHarg, Winfield, IL (US)

(73) Assignee: Television Audio, Inc., Oakbrook, IL (US)

( * ) Notice: Subject to any disclaimer, the term of this patent is extended or adjusted under 35 U.S.C. 154(b) by 597 days.

(21) Appl. No.: 09/795,985

(22) Filed: Feb. 28, 2001

(65) Prior Publication Data

US 2002/0160816 A1 Oct. 31, 2002

(51) Int. Cl.[7] ................................................. H04B 7/00
(52) U.S. Cl. ..................... 455/345; 455/566; 455/179.1; 455/352
(58) Field of Search ................................. 455/345, 566, 455/180.1, 161.1, 161.3, 352, 179.1

(56) References Cited

U.S. PATENT DOCUMENTS

| | | | | |
|---|---|---|---|---|
| 3,259,689 A | * | 7/1966 | Sienkiewicz | 348/725 |
| 4,435,845 A | * | 3/1984 | Timm et al. | 455/228 |
| 4,905,303 A | * | 2/1990 | Johnson et al. | 455/45 |
| 5,276,909 A | * | 1/1994 | Milner et al. | 340/7.49 |
| 5,842,119 A | * | 11/1998 | Emerson et al. | 455/161.3 |
| 6,002,924 A | * | 12/1999 | Takano | 455/161.1 |
| 6,532,592 B1 | * | 3/2003 | Shintani et al. | 725/141 |
| 6,636,273 B1 | * | 10/2003 | Weber | 348/734 |

* cited by examiner

Primary Examiner—Edward F. Urban
Assistant Examiner—Blane J. Jackson
(74) Attorney, Agent, or Firm—Robert B. Polit

(57) ABSTRACT

An apparatus for providing television audio programming that is derived from a broadcast television signal is set forth. The apparatus includes a transceiver that is adapted to selectively receive one of a plurality of broadcast television signals in response to a channel selection signal received at a channel selection input thereof. The transceiver converts the audio signal component of the television signal to a radio signal for reception by a radio receiver. The radio receiver, in turn, converts the radio signal to an audible audio signal corresponding to the television audio programming. The apparatus also includes a control module formed as a unit that is physically distinct from the transceiver. The control module includes a programmable microcontroller, a user interface connected to provide at least channel selection information to the programmable controller, and a display connected for control by the programmable microcontroller to indicate at least channel selection information to a user. The control module also includes a channel selection output connected for control by the programmable microcontroller that provides the channel selection signal to the transceiver.

29 Claims, 6 Drawing Sheets

APPARATUS AND METHOD FOR RECEIVING TELEVISION AUDIO SIGNALS IN A MOBILE VEHICLE

BACKGROUND OF THE INVENTION

The audio component of a television signal can have significant commercial value even when not accompanied by the corresponding video. This is particularly true in connection with news, sports and traffic broadcasts, which often contain a significant amount of audio information beyond the corresponding video information that accompanies the transmission. To this end, various apparatus have been developed to provide television audio, without the video, in a number of different environments. One such environment is the mobile vehicle, such as a truck, car, recreational vehicle, etc.

One apparatus purportedly suitable for receiving television audio in an automobile is set forth in U.S. Pat. No. 4,905,303, issued Feb. 27, 1990, to Johnson et al. The '303 patent discloses a converter that converts audio signals associated with commercial television transmissions for input into conventional AM/FM automobile receivers to facilitate listening to the audio portions of telecasts on conventional radios. Channel selection is provided by the user through a combined switch/potentiometer circuit that is used to generate the requisite tuning voltages. More particularly, the user switches between VHF low, VHF high and UHF frequency bands using a switch. Tuning of a particular television channel within the selected frequency band is accomplished by manual manipulation of a potentiometer by the user. The user is not provided with any indication of the channel to which the apparatus is tuned. Rather, the positions of the switch and potentiometer must be memorized by the user if the user is to return to a given television channel. Further, tuning a television channel with this configuration can be awkward and may be hazardous when used in a moving vehicle given that such complicated tuning steps are distracting to the driver.

Another vehicle-based receiver that is constructed to receive selected television audio broadcasts is illustrated in U.S. Pat. No. 5,276,909, to Milner et al. The receiver disclosed in the '909 patent is disposed between the vehicle's antenna and the vehicle's AM car radio. In furtherance of the stated goal of the disclosed apparatus, the receiver is specifically adapted to receive traffic information broadcasts that are transmitted on the second audio program (SAP) of television broadcast channels. More particularly, the receiver is adapted to selectively monitor predetermined broadcast segments of a specially formatted broadcast signal of the SAP. However, the receiver further includes a "TV Sound" mode of operation. In that mode, a one or two digit channel number is entered through a keyboard having keys 0–9, followed by activation of a "TV Sound" command key. Alternatively, a preset channel may be selected by pressing a selected command key. The '909 patent fails to disclose any details as to how the preset channel function is implemented.

The present inventors have recognized and addressed numerous problems associated with such prior television audio receivers. For example, a driver or passenger operating one of the foregoing television audio receivers in a vehicle is not provided with any indication as to which television broadcast channel the receiver is tuned. Additionally, selection of the television broadcast channel that a user wishes to listen to can still be quite complex. Further, the user must know which of the many television broadcast channels are used in a particular region in order to operate one of the foregoing receivers. These receivers, therefore, are not readily adaptable to operation in different broadcast regions—a significant detriment to a vehicle operator that frequently travels between multiple broadcast regions. Still further, none of the foregoing references set forth a physical construction for the receiver that can be readily installed in a vehicle. Accordingly, the present inventors have developed a television audio receiver that is particularly suitable for operation in a vehicle and that includes various design aspects that deal with one or more of the foregoing problems that they have recognized.

BRIEF SUMMARY OF THE INVENTION

An apparatus for providing television audio programming that is derived from a broadcast television signal is set forth. The apparatus includes a transceiver that is adapted to selectively receive one of a plurality of broadcast television signals in response to a channel selection signal received at a channel selection input thereof. The transceiver converts the audio signal component of the television signal to a radio signal for reception by a radio receiver. The radio receiver, in turn, converts the radio signal to an audible audio signal corresponding to the television audio programming.

The apparatus also includes a control module formed as a unit that is physically distinct from the transceiver. The control module includes a programmable microcontroller, a user interface connected to provide at least channel selection information to the programmable controller, and a display connected for control by the programmable microcontroller to indicate at least channel selection information to a user. The control module also includes a channel selection output connected for control by the programmable microcontroller that provides the channel selection signal to the transceiver.

In one embodiment, the apparatus is operable in an "All" channel mode and in a "Favorite" channel mode. These modes are selectable by the user through the user interface. Further, the receiver may be directed into an automatic programming mode in which all of the broadcast channels that are active within a given region or time are detected and stored for later retrieval in the "Favorite" channel mode. Other features and advantages of the apparatus will become apparent from the following detailed description of the embodiment of the invention.

DETAILED DESCRIPTION OF THE INVENTION

Figure 1:
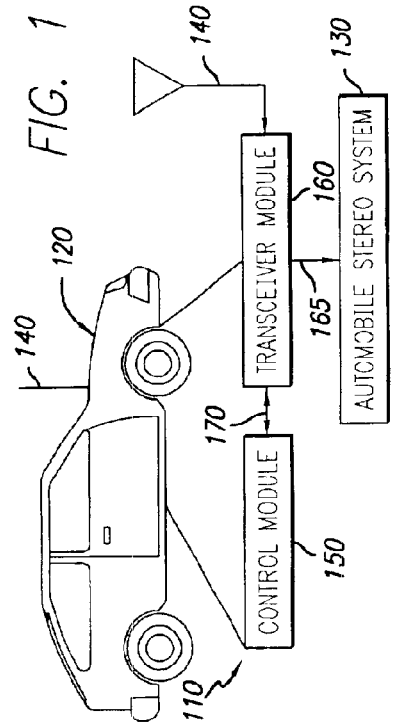
FIG. 1 is a schematic block diagram of a system including a receiver constructed in accordance with one embodiment of the present invention.

A block diagram of a television audio receiver constructed in accordance with one embodiment of the present invention is shown generally at 110 in FIG. 1. The television audio receiver 110 of this embodiment is shown in connection with its installation in a mobile vehicle, such as an automobile 120. In such an installation, the automobile 120 is equipped with a conventional stereo system 130 of the type used to receive standard AM/FM broadcast signals and a corresponding antenna 140. The stereo system 130 and the antenna 140 may be components that have been previously installed and used in the vehicle or, alternatively, may be installed concurrently with the television audio receiver 110. Both the stereo system 130 and the antenna 140 are used with the television audio receiver 110 to provide an occupant of the vehicle with audio from local television broadcast stations.

Generally stated, the television audio receiver 110 is comprised of a control module 150 and a transceiver module 160. Functionally, the transceiver module 160 may be constructed to receive television broadcast signals from the antenna 140 and re-broadcast the audio portion of selected television broadcast signals to the stereo system 130 via line 165. The signal is re-broadcast at an RF carrier frequency that is within the AM and/or FM tuning range of the stereo system 130. In this manner, the volume, tonality, and/or other audio frequency characteristics of the audio ultimately provided to an occupant of the vehicle 120 may be controlled using the existing panel controls of system 130. Such a configuration has a further advantage in that audio signal processing within the television audio receiver 110 may be kept to a minimum thereby decreasing the physical space requirements and component costs associated with the television audio receiver 110.

The control module 150 is an intelligent module containing a microcontroller or the like. Control module 150 is designed to provide several functions. First, the control module 150 provides a user interface that allows the occupant of the vehicle 120 to select the television channels that he/she wishes to hear. Second, the control module 150 provides one or more channel selection signals along a transmission medium 170 to the transceiver module 160. The transceiver module 160 uses the one or more channel selection signals to select which of the numerous television channel broadcast signals received at antenna 140 will have its audio portion re-broadcast on line 165 to stereo system 130. As will be set forth in further detail below, the transmission medium 170 can be a space constrained medium, such as metal conductors or fiber optics. Alternatively, transmission medium 170 may be a non-constrained medium, such as air, to facilitate transmission of the signals between control module 150 and transceiver module 160 using infrared or RF transmission signals. Third, the control module 150 provides an intelligent display that is under processor control and that at least indicates the channel selection to the occupant. Providing an intelligent display allows the occupant to safely and easily make the desired channel selections. As will be apparent from the detailed description of the embodiments of the transceiver module 160 and control module 150 set forth below, each module may be constructed to implement additional functions that further enhance the user controlled features of the television audio receiver 110.

Figure 2A:
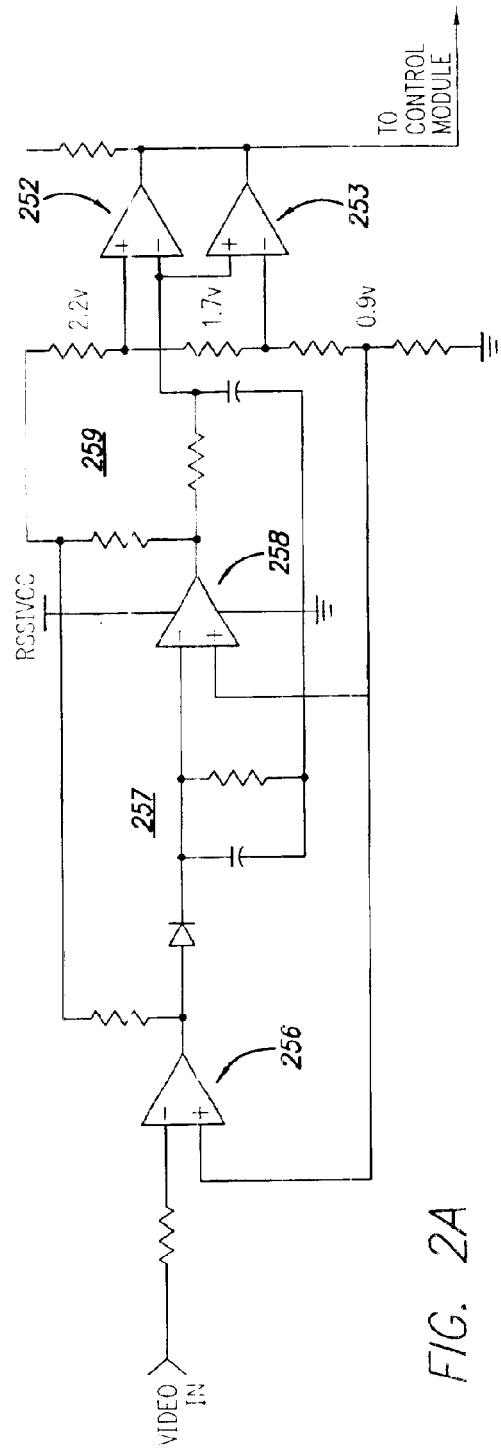
FIG. 2A is a schematic diagram of one embodiment of a received signal strength indicator circuit that may be used in the system shown in FIG. 2.
Figure 2:
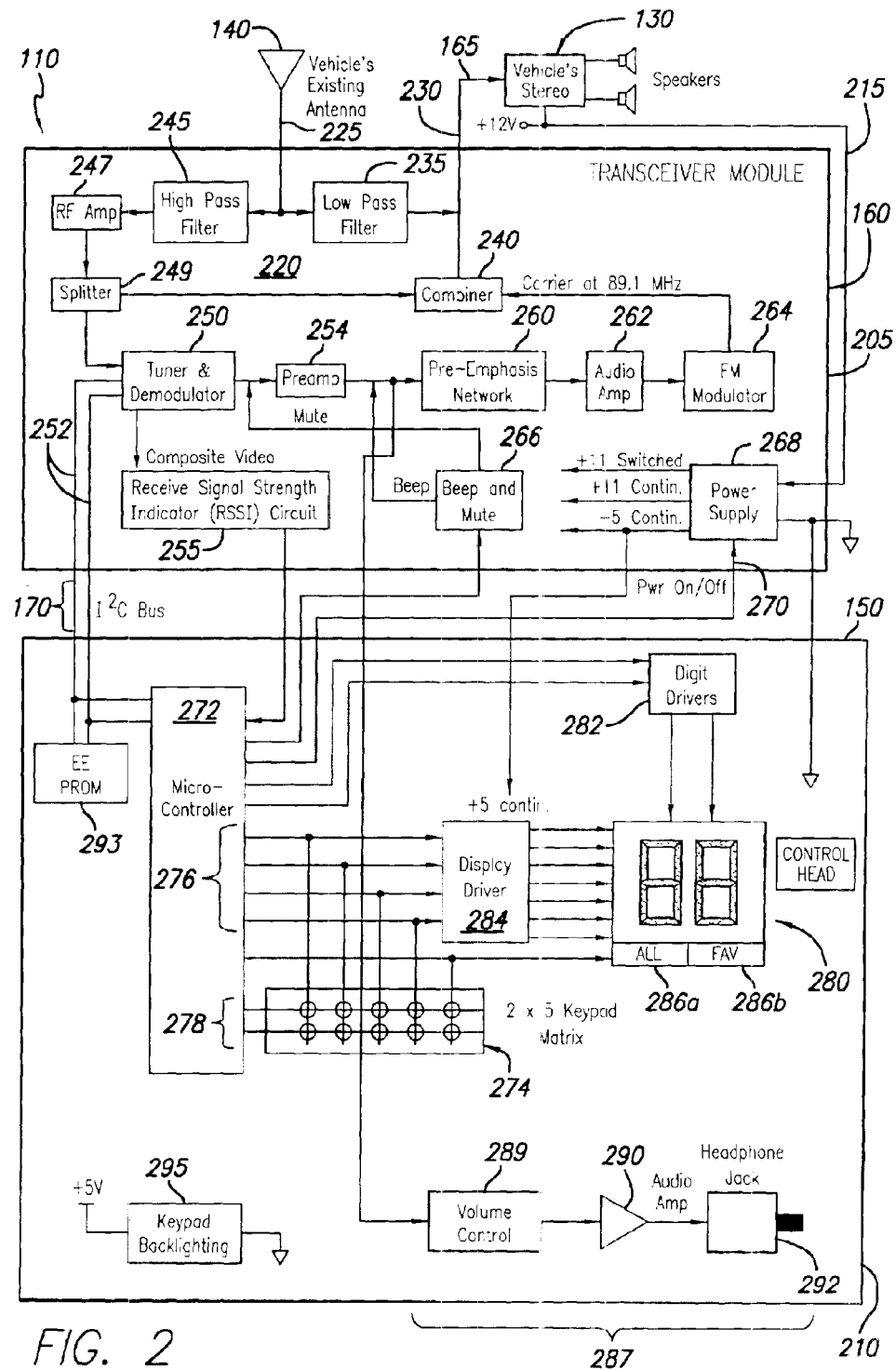
FIG. 2 is a more detailed schematic block diagram of the system shown in FIG. 1.

FIG. 2 is a block diagram of one embodiment of television audio receiver 110 that is designed to execute the foregoing functions as well as several additional functions that enhance the usability of the apparatus. In this embodiment of the television audio receiver 110, the control module 150 and transceiver module 160 may be disposed in separate housings 210 and 205, respectively. Further, the transmission medium 170 may be in the form of a plurality of conductors that transmit and/or receive signals at one or more corresponding connectors on or in housings 205 and 210. To simplify installation of this embodiment of the television audio receiver 110, the plurality of conductors may be physically tied to one another as a single cable that extends between a first connector of the transceiver module 160 and a second connector of the control module 150. Further, transceiver module 160 may be provided with individual connectors for connection to antenna 140, transmission line 165 and a source of external power, such as at line 215. In this manner, the number of connections that an installer must make to install this embodiment of the television audio receiver 110 may be kept to a minimum.

Transceiver module 160 may be mounted in the vehicle at a location that is physically separated from control module 150. For example, transceiver module 160 may be mounted under the dashboard of the vehicle since the functions that it performs do not generally require direct physical access by a user. The control module, which handles user input and provides information output regarding the operation of receiver 110 to a user, may be mounted at a fixed location within the passenger compartment of the vehicle, such as on the face of the dashboard at a position that is readily viewable by a driver or passenger in the vehicle.

As illustrated in FIG. 2, this embodiment of the transceiver module 160 comprises a coupler circuit, shown generally at 220. The coupler circuit 220 has an input 225 connected to receive broadcast signals from antenna 140 and an output 230 that provides standard AM and FM to RF broadcast signals as well as the processed television audio signal to a receiver of the car stereo system 130. Coupler 220 may comprise a number of filters that selectively amplify FM broadcast signals and television broadcast signals while leaving AM broadcast signals generally unaffected. To this end, coupler 220 includes a low pass filter 235 that is tuned to pass AM broadcast signals directly to the coupler output 230. FM and television broadcast signals are provided through a high pass filter 245 to the input of an RF amplifier 247. The amplified output from amplifier 247 may be provided through a splitter 249 to the input of a combiner circuit 240, where it is combined with the modulated television audio signal and provided to the input of stereo system 130 through output 230. In this embodiment, the standard FM broadcast signals are amplified for reception by the stereo system 130 and effectively receive a signal "boost" even when the stereo system 130 is not tuned to receive television audio. Further, the amplified output of amplifier 247 is provided through splitter 249 to the input of a tuner/demodulator 250.

Tuner/demodulator 250 may be constructed from a standard tuner/demodulator used in conventional television sets. Tuner/demodulator 250 is responsive to one or more input signals provided from control module 150, shown generally at 252, to select the television broadcast channel to which the tuner/demodulator 250 is tuned. In effect, the signals at lines 252 constitute channel selection signals that are generated in response to user inputs to the control module 150. These channel selection signals are used to direct the tuner/demodulator to receive and demodulate a television broadcast signal selected by the user. The demodulated audio of the selected television audio channel is provided to the input of a pre-amplifier 254 that serves as an input stage for an audio processing circuit, while the corresponding demodulated video signal is provided to the input of a received signal strength indicator circuit, shown generally at 255. The received signal strength indicator circuit 255 may, for example, include a horizontal sync rate band pass filter that is connected to receive the video output of tuner/demodulator 250. The filtered video signal from band pass filter may then be provided to the input of a level detector. The signal at the output of the level detector would then be indicative of the presence or absence of a television broadcast signal on the selected channel.

In accordance with another embodiment of the received signal strength indicator circuit 255, the circuit may be designed to detect the horizontal synchronization pulses present in the video band signal of the television transmission. This signal is typically quite large compared to other portions of the video band signal and, therefore, may be more readily detected.

One embodiment of a received signal strength circuit suitable for use in detecting the horizontal synchronization pulses is shown in the schematic diagram of FIG. 2A. The circuit operates on the assumption that horizontal synchronization pulses (the negative going pulse at the end of each horizontal sweep line) are present with little noise when the tuner/demodulator 250 is tuned to a channel on which a commercial station is broadcasting. When tuned to a channel that does not have a corresponding broadcast station transmission, the tuner 250, because of its automatic gain control circuitry, generates additional negative going noise pulses (with respect to the 0.95 VDC reference value). Based on these characteristics, the embodiment of the received signal strength indicator 255 of FIG. 2A employs four comparator circuits. Comparator 256 compares the composite video signal to a 0.95 VDC threshold. When the composite video signal drops below 0.95 VDC, the output of comparator 256 goes positive. This state occurs for normal horizontal synchronization pulses and for noise. The next stage is a sawtooth waveform generator, shown generally at 257. This waveform generator circuit 257 involves a diode, resistor and capacitor. When the output of comparator 256 goes positive, the output of the sawtooth waveform generator 257 also goes positive. When the output of comparator 256 goes low (i.e., at the end of the horizontal synchronization pulse), the output of the sawtooth waveform generator 257 slowly decays toward 0 VDC. Comparator 258 monitors the output of the sawtooth waveform generator 257. When the output of the tuner/demodulator drops below 0.95 VDC, the output of the sawtooth waveform generator 258 goes high. When a strong broadcast signal is present, only the horizontal synchronization pulses cause the output of comparator 256 to go high, and the time between the horizontal synchronization pulses is relatively long. During this interval, the output of the sawtooth waveform generator decays toward 0 VDC, and crosses through 0.95 VDC. This results in the generation of a positive pulse on the output of comparator 258. When there is a significant amount of noise present on the composite video signal, the signal goes below the 0.95 VDC threshold numerous times in the period of one horizontal line of the television picture. This causes the output of comparator 256 to go to a positive state several times in that interval. When this occurs, the sawtooth waveform generator re-triggers in this interval and never decays long enough to reach the 0.95 VDC threshold. As a result, the output of comparator 258 never goes to a positive state. When broadcast signals are present, the output of comparator 258 has a series of constant-width pulses on it at the horizontal sweep rate while the output remains at 0 VDC or otherwise varies somewhat with random noise when a broadcast signal is not present on the tuned channel.

The output of comparator 258 may be subject to further processing to derive a more usable binary state logic signal. In the illustrated embodiment, further processing is done by providing the output of comparator 258 to the input of a low pass filter 259 and a pair of comparators 252 and 253 that are connected in a wired-OR configuration (although the wired-OR configuration may be replaced by a logic OR gate). More particularly, the low pass filter 259 converts the series of pulses output from comparator 258 into a voltage that is dependent on the broadcast signal state. For example, the output may be about 2.3 VDC for channels having a broadcast signal and around 0 VDC for channels that do not have a corresponding broadcast station. Comparator 253 compares the output of the low pass filter to a low threshold voltage of 2.1 VDC. When the signal falls below 2.1 VDC, the output of comparator 253 goes low. Comparator 252 compares the output of the low pass filter to a threshold of 2.5 VDC. When the signal is above 2.5 VDC, the output of comparator 252 goes low. Since comparators 252 and 253 are wire-OR'ed to create the broadcast signal present/not present output, when either comparator 252 or 253 detect an out of range condition on the output of the low pass filter, then the output of the received signal strength indicator circuit 250 goes to logical low state indicating that a broadcast signal is not present on the tuned channel. If the output of the low pass filter is between 2.1 and 2.5 VDC, then neither comparator 252 or 253 go to a low level logic state, and the output of the received signal strength indicator circuit 255 is at a high state thereby indicating the presence of a broadcast signal on the tuned channel.

Alternatively, the output of comparator 258 may be processed by the microcontroller 272. For example, microcontroller 272 may be programmed to poll the signal output of comparator 258. If desired, digital filtering or the like may also be employed. It will be recognized that numerous such configuration may be implemented.

As will be set forth in further detail below, the signal generated at the output of the RSSI circuit 255 may be used by the control module 150 to program/re-program the receiver 110. Through such programming, a user may readily direct the receiver to receive only the television audio of television broadcast channels that are active in a particular region or at a particular time.

The amplified audio output of pre-amplifier 254 is provided to the input of further stages of the audio processing circuit. In the illustrated embodiment, these further stages are comprised of a pre-emphasis network 260 and an audio amplifier 262. The processed audio of the audio processing circuit is provided to the input of an FM modulator 264 that modulates the processed audio to a carrier frequency that is within the range of standard FM broadcast frequencies to which the car stereo system 130 may be tuned. The carrier frequency of the FM modulator 264 may be a selected in any number of ways, including:

1. Fixed by the manufacturer;
2. Selectable by an installer during installation; or
3. User programmable based on user input that is provided through some sort of user interaction with control module 150, such as through key-presses.

As will be set forth in further detail below, the modulator 264 may be comprised of a three-stage circuit. More particularly, the modulator may be comprised of a voltage-controlled crystal oscillator, an amplifier stage with filtering to eliminate (or reduce) all but the desired harmonies and an output stage with impedance matching.

Transceiver module 160 may also include one or more components that are responsive to signals received from the control module 150 to mute the television audio and/or to provide an audible feedback signal to the user indicating execution of selected commands input by the user. In the illustrated embodiment, these functions are provided by a beep and mute circuit 266. As shown, the beep and mute circuit 266 includes a first output that is connected to the audio processing circuit, such as at the input of pre-emphasis network 260, that effectively causes the audio output from tuner 250 to be blocked from transmission to the remaining portions of the audio processing circuit. Further, the beep and mute circuit 266 includes a second output that is connected to the audio processing circuit. The second output is provided to inject a beep or other audible feedback signal into the audio processing circuit to provide the user with an indication that the receiver has executed some action.

Receiver 110 is preferably constructed so that it receives power from the electrical system of the vehicle 120. In most instances, the power provided by such vehicle electrical systems is at a nominal voltage of 13.8 VDC. Since the power requirements of various components of the receiver 110 extend beyond the capabilities of the electrical power system of the vehicle, receiver 110 is provided with a power supply 268. Power supply 268 receives the nominal 13.8 VDC from the vehicle and regulates it to both 5.0 VDC and 11.0 VDC for use by the various components of the receiver 110. Power supply 268 may be responsive to a power on/off signal provided, for example, at line 270 (or over some other transmission medium) from control module 150. The power on/off signal may be generated in the control module 150 based on user input to the user interface.

FIG. 2 also illustrates one embodiment of the control module 150. The control module 150 is preferably designed as a unit that is physically separated from the transceiver module 160. For example, the control module 160 may be constructed as a small, thin device that is approximately one by four inches. In the illustrated embodiment, the control module 150 is hard-wired to the transceiver module 160.

Control module 150 includes a microcontroller 272 having electronic memory that contains intelligent programming to execute various receiver control functions. With respect to the embodiment set forth herein, such programming may execute the following program operations:

Checking for commands input by the user

Executing commands input by the user

Providing the user with visual and/or audible acknowledgment that the commands input by the user have been executed Providing the user with a visual indication of the status of the receiver (i.e., channel selection, mode of operation, etc.)

Microcontroller 272 accepts commands from the user through a user input interface. In the illustrated embodiment, this interface is in the form of a manually activated keypad, shown generally at 274. Keypad 274 may be connected to the microcontroller 272 in a matrix format so that the individual keys of keypad 274 can be scanned by the microcontroller 272 to determine whether or not one or more of the keys have been activated. When the microcontroller 272 detects that a key has been actuated, the stored programming associated with the actuated key is executed to carry out the action requested by the user.

One way in which the microcontroller 272 may scan the individual keys of the keypad 274 is by selectively activating individual signals on lines 276 and reading the signal states on lines 278. Alternatively, the signal states lines 278 may be connected to interrupt inputs to thereby eliminate the need for scheduling the reading of the signal states on a regular basis. Rather, the signal states on lines 276 may be individually activated with a signal state that will generate an interrupt on lines 278. The microcontroller 272 will then only need to read the state of keyboard 274 when an interrupt is detected on lines 278. It will be recognized, however, that the foregoing keyboard scanning techniques are merely exemplary and that other scanning techniques can be used depending on the type of user input interface that is employed.

Visual acknowledgment that a command has been executed by the receiver 110 may be provided through a display interface. In the illustrated embodiment, the display interface is in the form of a multi-digit, multi-segment illuminated display, shown generally at 280. Various display technologies can be used for the display 280. Such technologies include LED, vacuum fluorescent, LCD, CRT, gas plasma display, etc. Selection of the specific display technology is dependent on the particular environment in which the display is to operate.

For exemplary purposes, display 280 is comprised of a 2-digit, 7-segment LED display. Accordingly, control module 150 includes a display driver interface that is specifically adapted to control an LED display. To this end, the display driver interface is comprised of a digit driver circuit 282 and a segment driver circuit 284, each of which, in turn, is controlled by the microcontroller 272. The microcontroller 272 activates the digit driver circuit 282 to multiplex the digits of display 280. As a particular digit is activated, microcontroller 272 provides the appropriate BCD code to the segment driver circuit 284 so that only selected segments of the digit are illuminated. From the perspective of the user, the illuminated segments form recognizable characters, such as letters, numerals, conventionally recognized signs, etc. Microcontroller 272 selects which of these characters, letters, etc., are provided to the user based on the user interface programming contained in its memory. For example, microcontroller 272 can direct the display 280 to form numerical characters corresponding to the currently selected television channel for which audio is being provided by the receiver 110. Such operations, as well as others, will be described in further detail below in connection with a discussion of various exemplary software routines that may be implemented in the programming executed by the microcontroller 272.

In the illustrated embodiment, economy of design is achieved by, among other things, using the signals provided at lines 276 to implement both the keyboard scanning and to provide the BCD code data to the segment driver circuit 284. This concurrent, dual use of lines 276 reduces the input/output line requirements of the microcontroller 272 thereby allowing use of a microcontroller having fewer input/output lines. The number of input/output lines that are provided by a microcontroller 272 has a direct correlation with its price. As a result, less expensive microcontrollers can be used in the receiver design shown in FIG. 2, if desired. Alternatively, a more expensive microcontroller having a larger number of input/output lines can be used and additional functionality employing the further input/output lines can be added to the receiver 110.

Further visual indicia are also employed in the user interface display of the illustrated embodiment. These further indicia are provided in the form of individually activated lamps, such as at 286a and 286b, that are controlled by the microcontroller 272 in a binary manner (e.g., they are either on or off). Such lamps can be used to provide the user with an indication of the current mode of operation of the receiver 110. As shown, microcontroller 272 may be used to directly activate one or both of lamps 286a and/or 286b in synchronization with the digit driver circuit 282.

As noted above, receiver 110 may include circuitry that provides the user with audible feedback that an instruction through the user interface has been executed by the receiver. For example, microcontroller 272 may provide an actuating signal to the beep and mute circuit 266 that, in turn, injects audio into the audio signal chain of the transceiver module 205.

There are many instances in which a passenger in a vehicle may want to listen to television audio while the driver or other occupant wants to listen to an FM broadcast, AM broadcast or pre-recorded audio material on the stereo system 130. To provide a solution to such situations, receiver 110 may be provided with a headphone listening circuit 287. The headphone listening circuit 287 receives television audio from an output of the audio signal chain of the transceiver module 160. In the illustrated embodiment, the headphone listening circuit 287 is comprised of a volume control 289, an audio amplifier 290 and a headphone jack 292. The volume control may be controlled by the microcontroller in response to presses of the keys on keypad 274 or, alternatively, may be in the form of a variable resistor that can be manually manipulated by the user. In each instance, the volume control allows the user to adjust the volume of the television audio provided through the headphone jack to a comfortable level.

Other advantageous features are also included in the control module 150. For example, control module 150 may include memory, such as EEPROM 293, which can be used to store such things as user preferences; the active broadcast channels of a given regional area, favorite channels, etc. Further, control module 150 may include a keypad backlighting circuit, such as at 295, which allows a user to view the keypad and corresponding indicia in low-light conditions. Others additional features may also be implemented in the control module.

Figure 2B:
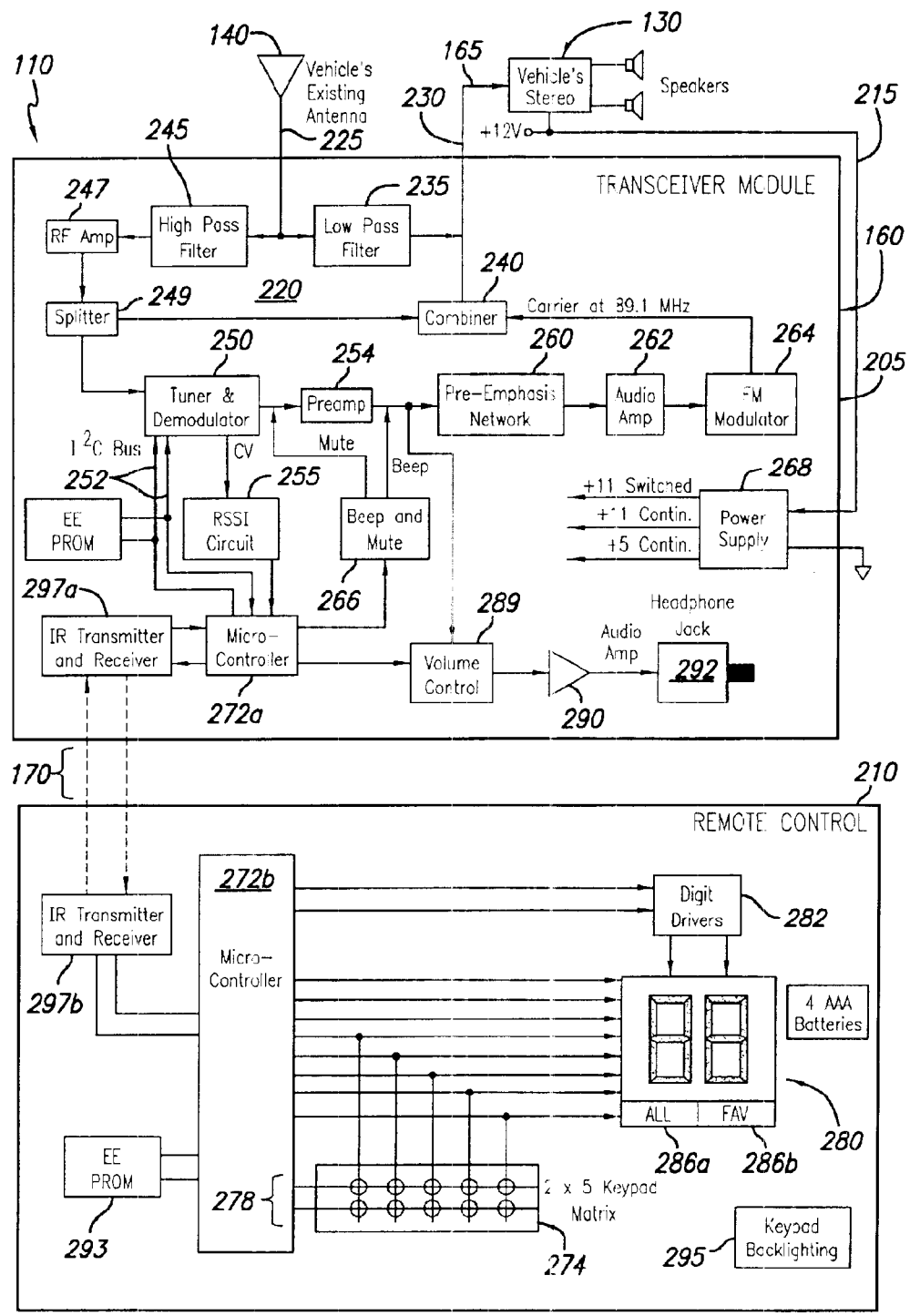
FIG. 2B is a schematic block diagram of the system shown in FIG. 1 wherein communication between the transceiver and control module utilizes infrared data transmission.

FIG. 2B illustrates an alternative embodiment of the receiver in which control and data signals are sent between the modules through infrared transmissions. As shown, the control module 150 and transceiver module 160 may both be constructed as intelligent modules that communicate with one another through an exchange of digital infrared commands. Control module 150 is preferably in the form of a handheld remote control unit. In such instances, the headphone listening circuit 287 is preferably not part of the control module 150. Rather, at least some portions of the headphone listening circuit 287 may be housed with the transceiver module 160 while headphone jack 292 is mounted at a convenient location on the dashboard.

To facilitate the infrared communication between the units, control module 150 and transceiver module 160 are each provided with a corresponding infrared transmitter/receiver 297a and 297b. Each transmitter/receiver 297a and 297b is connected to a respective microcontroller 272a and 272b. The data transmitted between the control module 150 and transceiver module 160 may include, for example, user commands, command completion acknowledgments, favorite channel information, an indication of which channels have strong broadcast signals, etc. Additional data communications may also be provided, or some of the foregoing may be deleted, depending on the specific functionality desired by the designer.

Exemplary Mechanical Layout of the Control Module

Figure 3:
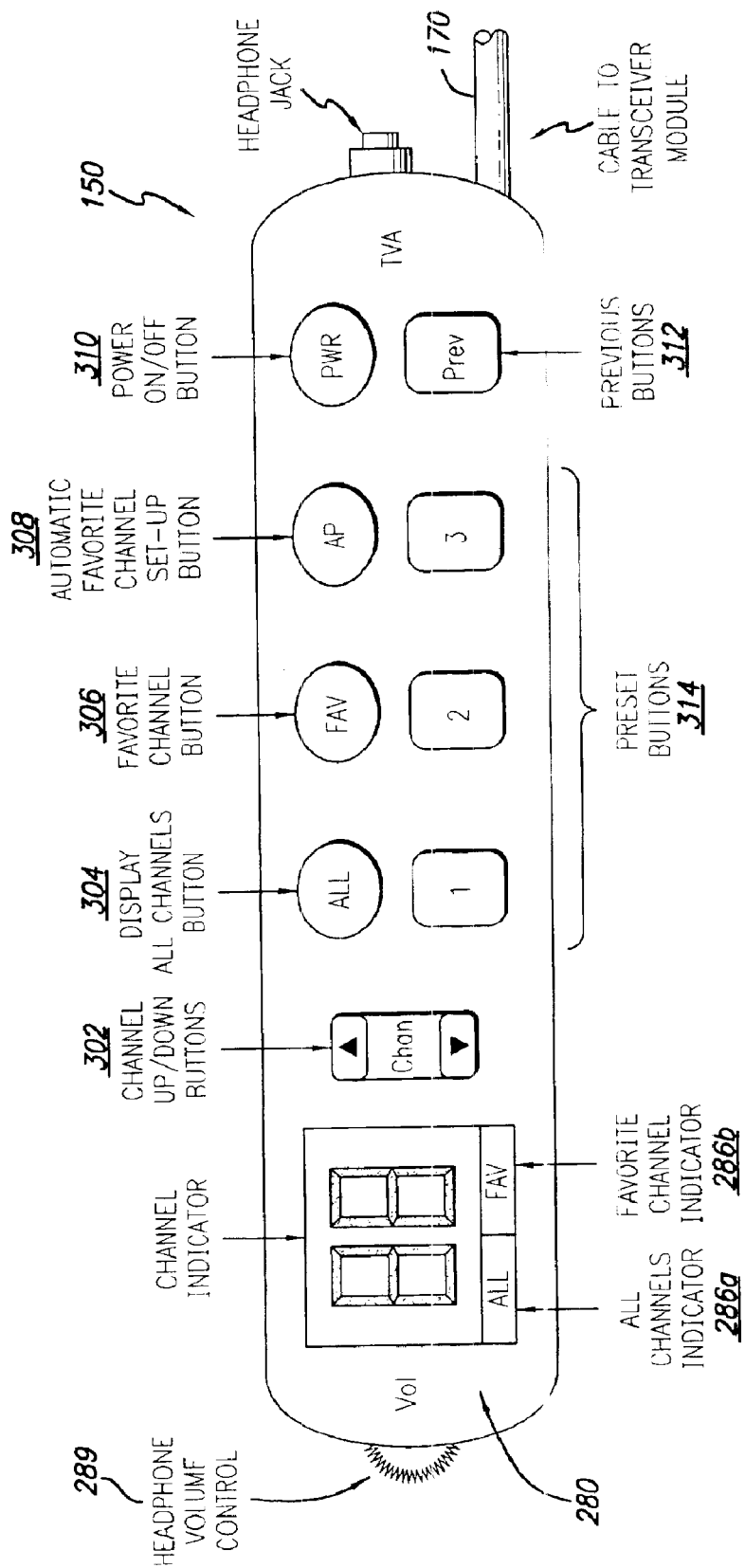
FIG. 3 illustrates one manner in which the user interface portions of the control module of FIG. 2 may be presented to the user.

FIG. 3 illustrates one manner in which the control module 150 may be constructed. Control module 150 may be constructed in the form of a handheld unit having a cable 170 extending from a first of the end thereof that connects to the respective portion of the transceiver module 160. A second end of the control module 150 is provided with a headphone volume control potentiometer 289 having a serrated edge that is exposed for manipulation by the user. A number of buttons are disposed on the front panel of the control module 150. These buttons include visual indicia corresponding to the particular function(s) that are executed by the receiver when the button is pressed. These buttons/functions include the following: channel up/down buttons 302; display all channels button 304; favorite channel button 306; automatic favorite channel set-up button 308; power on/off button 310; previous button 312; and preset buttons 314. Operation of these buttons will be set forth in further detail below in connection with the exemplary software that is used to implement the functions when the buttons are pressed.

Exemplary Software

Figure 4:
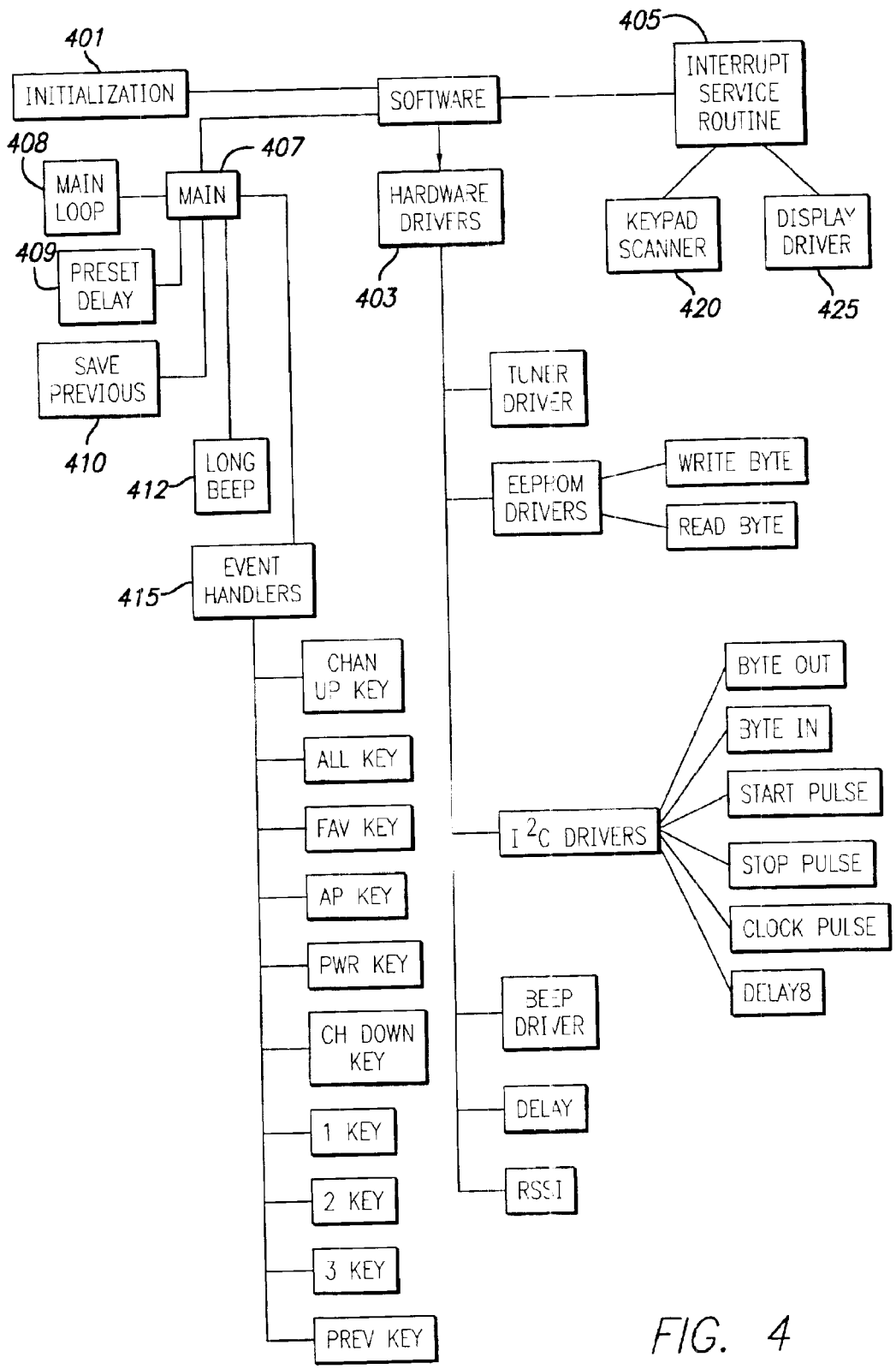
FIG. 4 is a software flowchart illustrating one embodiment of a software architecture that may be used to control the system of FIGS. 2 and 3.

FIG. 4 is a flowchart that illustrates one manner in which the software architecture for the receiver 110 may be implemented. The various software modules illustrated in FIG. 4 may be divided into four general categories: initialization routines 401, hardware driver routines 403, interrupt service routines 405, and the main program 407.

Generally stated, the initialization routines 401 are executed at power-up. During power-up, these routines do such things as initialize the input/output ports, initialize a timer, enable interrupts, initialize the display, initialize the tuner and demodulator 250 to an initial state, and retrieve configuration information from the memory 293.

The main program 407 may be comprised of a number of sub-modules. Included in these modules is a main loop 408 that may be constructed as an endless loop that waits for a key to be pressed. The main program 407 may also include such sub-routines as the implementation of a preset delay 409, saving of a previous channel 410, execution of a long beep sound 412, and events handlers, shown generally at 415. Event handlers 415 execute one or more functions in response to a key press. If the receiver 110 is in the "OFF" state, all key presses are ignored except the PWR key, which turns the unit on. Further details in connection with the event handlers will be discussed below.

The hardware drivers 403 are blocks of code (subroutines) that are called by the initialization routine 401 and the main program 407. These routines are used to control the hardware in response to commands received from the initialization program 401 and main program 407. As such, the hardware drivers 403 are configured to control the tuner/demodulator 250 as well as to read and write data to and from external memory 293 (if provided). Further, these drivers may, if desired, be used to control the display 280 and the corresponding individual LED indicators 286.

The interrupt service routine 405 may be implemented in conjunction with a hardware timer on-board microcontroller 272. More particularly, routine 405 may be executed every time the hardware timer expires and generates a real time interrupt. For example, the initialization routine may direct the hardware timer to generate a real time interrupt every 8.2 milliseconds. A subroutine of the interrupt service routines is the keypad scanner routine 420. Keypad scanner routine scans the keypad and records the number of the current key pressed, if any, in a variable designated as KEY. This variable is then available for testing and reading in the main program 407. As will be explained in further detail below, the variable is used by the main program 407 to call the appropriate event handler 415 which, in turn, executes the function(s) associated with the key variable.

A further subroutine of the interrupt service routines is the display driver routine 425. The display driver routine calculates the values of the 2 digits that are to be displayed on display 280. It then drives the right digit or left digit on alternate passes through the interrupt service routine.

Figure 5:
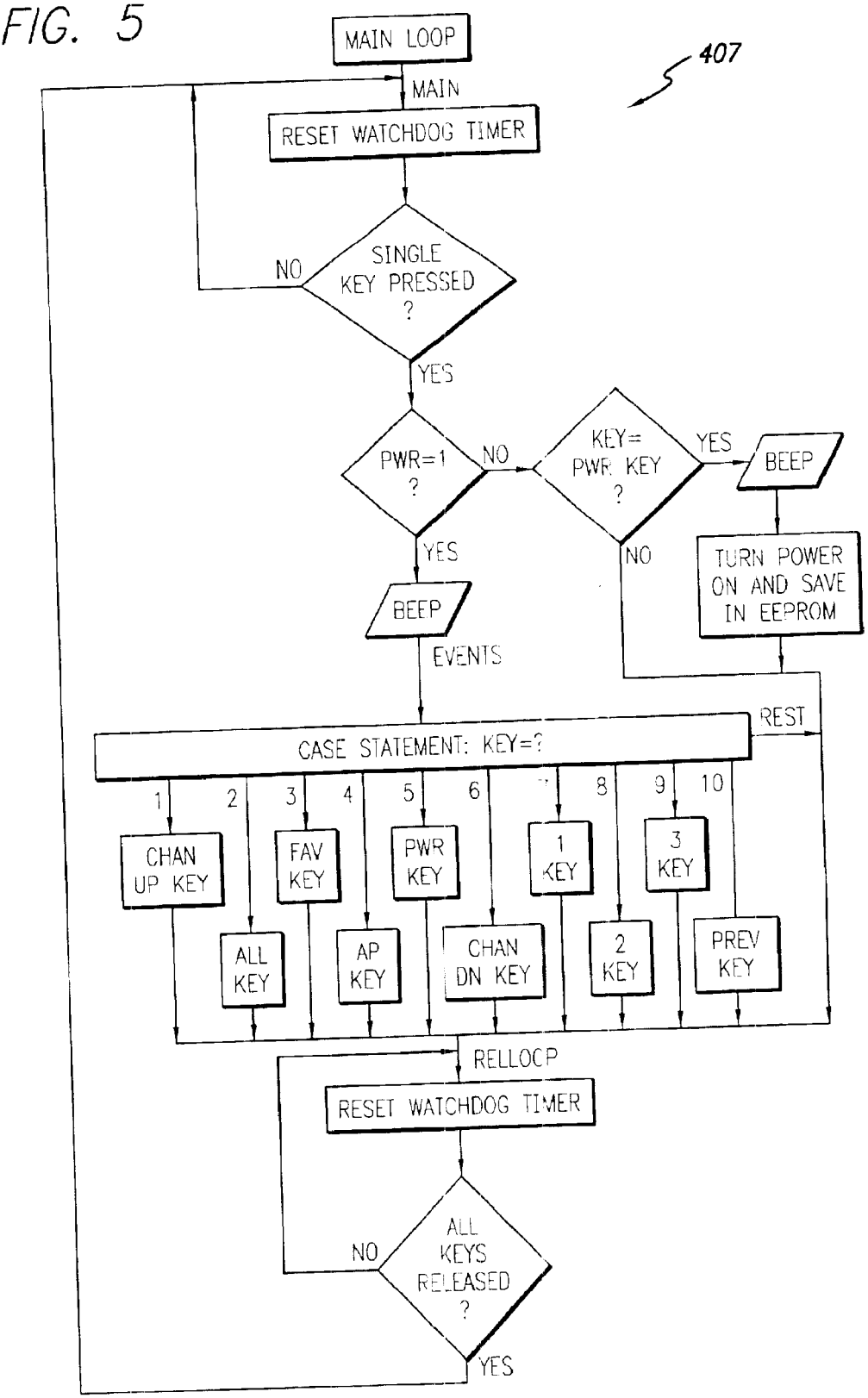
FIG. 5 is a software flowchart illustrating one embodiment of the main program shown in FIG. 4.

FIG. 5 illustrates one way of implementing the main program 407. After initialization, the main program 407 begins by executing a main loop. The main loop constantly checks the keypad for a key press. It also resets the watchdog timer on each pass through the loop. If no key is pressed (or multiple keys are pressed) control returns to the top of the endless loop. If a key is pressed a one-bit variable designated as PRW is tested. If the unit is on (PWR bit=1) then a beep is given and the appropriate event handler for that key is called. Upon completion of the event handler, control passes to the bottom of the flowchart of FIG. 5 where an endless loop waits for all keys to be released. This endless loop also resets the watchdog timer In some cases (such as when a preset is recalled), all keys are already released when control gets to RELLOOP. In this case control passes through the released keys test. When all keys have been released then control returns to the top of the main loop. As would be understood by those in the art, an appropriate debounce routine may be implemented as part of the keypress detection process.

If the receiver is off (PWR=0) when a key press is detected, then the value of the variable KEY is tested. If the variable KEY does not equal 5 (the variable assigned to the power key), then the PWR key was not pressed and control passes to the endless loop waiting for all keys to be released. If the variable KEY is equal to 5, then microcontroller 270 recognizes that the power on/off key 310 was pressed. In this case a beep is given, the unit is powered up, the new state of the receiver 110 is recorded, and control passes to the endless loop waiting for all keys to be released.

With the foregoing software architecture, it is possible to execute a wide range of functions in response to a key press, each key press or group of key presses being associated with a corresponding event handler subroutine. For example, the following functions can be executed when the corresponding key is pressed:

| KEY | FUNCTION |
|---|---|
| Channel up/down buttons 302 | Directing the receiver 110 to the next channel that is above or below the currently displayed channel. Whether the next channel is selected from a group of all television channels or from a group of channels designated by the user is dependent on the mode of operation of the receiver 110, as will be understood from the following functional descriptions. Pressing and holding the channel up/down buttons causes rapid scrolling through the channels (either favorites or all channels, depending on the mode) |
| Display all channels button 304 | Directing the receiver 110 to toggle between the "All" and "Favorite" channel modes. In "All" channel mode, all television channels from channel 2 through channel 69 are included when the channel up/down buttons are pressed. In this mode, the "All" channels indicator 286a is illuminated. In "Favorite" mode, only channels previously designated as favorites are included when the channel up/down buttons are pressed. In this mode, the "All" channels indicator 286a is not illuminated. |
| Favorite channel button | The "Favorite" channel button 306 may be pressed to add/remove the then-current channel as a favorite channel. When the displayed channel is marked as a favorite, the "Favorite" channel indicator 286b is illuminated. |
| Automatic favorite channel set-up button 308 | Directing the receiver 110 to scan for all of the television broadcast channels that are active in the region in which the mobile vehicle 120 is situated. In the disclosed embodiment, the detection of active television broadcast channels is implemented in conjunction with the received signal strength indicator circuit 255. The channels that are detected as having broadcast transmissions during this scan are identified in EEPROM 293 for later recall when the receiver is in the favorite channels mode of operation. |
| Previous button 312 | Directing the receiver 110 to tune to the prior channel that the receiver was tuned to prior to the current channel. The prior channel value is preferably stored in EEPROM 293. |
| Preset buttons 314 | Directing the receiver 110 to tune to the channel that is associated with the respective preset button. Further, when pressed for a predetermined period of time, such as three seconds, the receiver 110 assigns the then-current channel to the respective preset button. The channels assigned to the individual preset buttons are stored in EEPROM 293. |

Numerous modifications may be made to the foregoing system without departing from the basic teachings thereof. Although the present invention has been described in substantial detail with reference to one or more specific embodiments, those of skill in the art will recognize that changes may be made thereto without departing from the scope and spirit of the invention as set forth in the appended claims.

What is claimed is:

1. An apparatus for providing television audio programming to one or more individuals in a mobile vehicle, the audio programming being derived from a television signal that includes an audio signal component and a video signal component, the audio signal component directly corresponding to the video signal component, the apparatus comprising:

a transceiver disposed in a first section of the mobile vehicle, the transceiver being adapted to selectively receive one of a plurality of television signals in response to a channel selection signal received at a channel selection input thereof, the transceiver converting the audio signal component of the television signal to a radio signal for reception by a radio receiver that converts the radio signal to an audible audio signal corresponding to the television audio programming;

a control module formed as a unit that is physically distinct from the transceiver, said control module being disposed in a second section of said mobile vehicle remote of the transceiver, the control module including a programmable microcontroller;

a user interface connected to provide at least channel selection information to the programmable controller;

a display connected for control by the programmable microcontroller to indicate at least channel selection information to a user;

a channel selection output connected for control by the programmable microcontroller and providing the channel selection signal to the transceiver;

the transceiver and control module cooperating to execute an automatic programming mode in which the transceiver scans through a predetermined range of television channels, the automatic programming mode being activated through the user interface of the control module;

a relative signal strength indicator circuit adapted to generate a signal strength output signal during the automatic programming mode, the signal strength output signal being indicative of the presence of a television signal on a television channel to which the transceiver is tuned, the relative signal strength indicator operating to detect the presence of a television signal on a channel by detecting the presence of a video horizontal sync signal;

electronic memory identifying the channels that have a television signal transmitted thereon as determined by the level of the signal strength output signal of the relative signal strength indicator circuit during the automatic programming mode.

2. The apparatus of claim 1 wherein the transceiver comprises:

a tuner;

a demodulator having an audio signal output corresponding to the audio signal component of the television signal on the television channel to which the tuner is tuned;

an audio processor receiving the audio signal output from the demodulator;

a modulator having an input connected to receive processed audio from the audio processor and an output connected to provide the radio signal for reception by the radio receiver.

3. The apparatus of claim 2 and further comprising an audio output port connected to provide demodulated audio corresponding to the audio signal component of the television signal on the channel to which the tuner is tuned.

4. The apparatus of claim 3 wherein the control module further comprises an audio input port, the audio output port of the transceiver connected to the audio input port of the control module.

5. The apparatus of claim 4 wherein the control module further comprises a headphone jack, the audio signal received at the audio input port being provided to the headphone jack disposed on the control module.

6. The apparatus of claim 5 wherein the audio signal received at the audio input port is amplified before being provided to the headphone jack.

7. The apparatus of claim 6 wherein the control module comprises a volume control circuit connected to control the volume of the audio provided to the headphone jack.

8. The apparatus of claim 7 wherein the volume control circuit comprises one or more selection inputs of the user interface.

9. The apparatus of claim 1 and further comprising a transmission medium disposed between the control module and the transceiver to transmit the channel selection signal from the control module to the transceiver.

10. The apparatus of claim 9 wherein the transmission medium comprises a metal conductor.

11. The apparatus of claim 9 wherein the transmission medium is air.

12. The apparatus of claim 11 wherein the channel selection signal is an infrared signal.

13. The apparatus of claim 1 and further comprising a relative signal strength indicator circuit adapted to generate a signal strength output signal, the signal strength output signal being indicative of the presence of a television signal on a television channel to which the transceiver is tuned.

14. The apparatus of claim 1 wherein the control module is operable in a favorite channel operating mode in which the control module limits channel selection through the user interface to only the channels identified during the automatic programming mode as having a television signal transmitted thereon.

15. The apparatus of claim 1 wherein the user interface comprises a keypad.

16. The apparatus of claim 15 wherein the user interface comprises a display.

17. The apparatus of claim 15 wherein the control module is programmable through the user interface to assign a television channel selection directly to a key of the keypad, the control module thereafter generating a channel selection signal to the transceiver in response to manual actuation of the key to tune the transceiver to the assigned television channel selection.

18. An apparatus for providing television audio programming to one or more individuals in a mobile vehicle, the audio programming being derived from a television signal that includes an audio signal component and a video signal component, the audio signal component directly corresponding to the programming provided on the video signal component, the apparatus comprising:

a transceiver adapted to selectively receive one of a plurality of television signals in response to a channel selection signal received at a channel selection input thereof, the transceiver converting the audio signal component of the television signal to a radio signal for reception by a pre-existing radio receiver in the mobile vehicle that converts the radio signal to an audible audio signal corresponding to the television audio programming;

a relative signal strength indicator circuit adapted to generate a signal strength output signal, the signal strength output signal being indicative of the presence of a television signal on a television channel to which the transceiver is tuned;

a control module including a user interface and a signal generator responsive to user inputs provided at the user interface to generate the channel selection signal for provision to the channel selection input of the transceiver, the control module being adapted for activation through the user interface to enter an automatic programming mode in which the control module automatically varies the channel selection signal in a manner that causes the transceiver to scan through a predetermined range of television channels, the control module being responsive to the signal strength output signal as the transceiver scans through the predetermined range of television channels to identify television channels having a television signal transmitted thereon;

electronic memory disposed in the control module to identify the channels that have a television signal transmitted thereon as determined by the level of the signal strength output signal of the relative signal strength indicator circuit during the automatic programming mode;

the control module further being operable in a favorite channel operating mode in which the control module limits channel selection through the user interface to only the channels identified during the automatic programming mode as having a television signal transmitted thereon.

19. The apparatus of claim 18 wherein the transceiver comprises:

a tuner, a demodulator having an audio signal output corresponding to the audio signal component of the television signal on the television channel to which the tuner is tuned;

an audio processor receiving the audio signal output from the demodulator;

a modulator having an input connected to receive processed audio from the audio processor and an output connected to provide the radio signal for reception by the radio receiver.

20. The apparatus of claim 19 and further comprising an audio output port connected to provide demodulated audio corresponding to the audio signal component of the television signal on the channel to which the tuner is tuned.

21. The apparatus of claim 20 wherein the audio output port is connected to an audio input port of the control module.

22. The apparatus of claim 21 wherein the audio signal received at the audio input port is provided to a headphone jack disposed on the control module.

23. The apparatus of claim 22 wherein the audio signal received at the audio input port is amplified before being provided to the headphone jack.

24. The apparatus of claim 23 wherein module comprises a volume control circuit connected to control the volume of the audio provided to the headphone jack.

25. The apparatus of claim 18 and further comprising a transmission medium disposed between the control module and the transceiver to transmit the channel selection signal from the control module to the transceiver.

26. The apparatus of claim 25 wherein the transmission medium comprises a metal conductor.

27. The apparatus of claim 25 wherein the transmission medium is air.

28. The apparatus of claim 27 wherein the channel selection signal is an infrared signal.

29. The apparatus of claim 18 wherein the relative signal strength indicator detects the presence of a television signal on a channel by detecting the presence of a video horizontal sync signal.

* * * * *